Patented Oct. 23, 1934

1,978,079

UNITED STATES PATENT OFFICE 1,978,079

GLANDULAR HORMONE IN AQUEOUS SOLUTION AND METHOD OF PRODUCING THE SAME

Frank R. Eldred, Jersey City, N. J., assignor to Reed & Carnrick, Jersey City, N. J., a corporation of New Jersey No Drawing. Application May 2, 1927, Serial No. 188,404

6 Claims. (Cl. 167—74)

This invention relates to a glandular extract or hormone for use in the treatment of human beings and to a method of producing the same, and particularly to a glandular extract or hormone, more soluble in oil or lipoid solvents than in water suspended in an aqueous solution for use by injection.

It has long been recognized that the administration of solutions in oil by injection has serious objections because of the fact that the oil or other carrying agent is not readily absorbed and if injected subcutaneously produces irritation and sometimes necrosis, due primarily to the oil or other carrier. Certain glandular extracts, such as insulin, for example, are readily soluble in water and are commonly administered therefore in an aqueous solution. Other glandular extracts or hormones, such as the ovarian or testicular hormones, while readily soluble in oil appear to be insoluble in water and it has heretofore been impossible to secure an active aqueous solution of them.

Emulsions or suspensions in water can be prepared, but these lack permanency and, in a certain degree, are open to the same objections as oily solutions.

It is an object of the present invention to provide an active aqueous solution of hormones which are more readily soluble in oils or lipoid solvents than in water, especially those of the sex glands.

Another object of the invention is to provide a method whereby such aqueous solutions of the sex hormones in a high state of purity may be produced without substantial loss of active hormone and without greatly increasing the cost of the same.

A more particular object of the invention is to provide an active hormone of the ovary or testicle in a high state of purity, dissolved in a non-irritant aqueous medium and the method of producing the same from the oil soluble hormones previously used.

Various other objects and advantages will appear as the description proceeds.

In my copending application, Serial No. 175,933, filed March 16, 1927, I have described a method of producing an ovarian hormone in an active and highly purified state and have also referred to the use of such hormone, dissolved in oil or water by injection either subcutaneously or intramuscularly for the treatment of certain specific symptoms resulting from dysfunctions of the corresponding glands. An oil soluble ovarian hormone and method of producing the same is also described in the patent to Sigmund Fraenkel and Edmund Herrmann, No. 1,314,321, granted August 26, 1919, and at various places in the literature. Previous to my present invention, it has not been possible to produce a satisfactory aqueous solution of the testicular or ovarian hormones however and the use of an oil carrier is objectionable because of irritation and lack of absorption and many members of the medical profession prefer to make the administration by subcutaneous injection, which can be safely done only when the hormone is suspended in an aqueous solution. Previous attempts to obtain the hormones in aqueous solution have, however, been unsatisfactory because of the inability to get the active hormone into aqueous solution or because of the loss of activity of the hormone in such attempt.

I have discovered that the previous difficulties in securing aqueous solutions of certain hormones which are more readily soluble in oil and lipoid solvents than in water, particularly the ovarian and testicular hormones, resided in the differences in solubility in the various solvents. The sex gland hormones in the highest state of purity previously attained appear as a light yellow waxy or oily material, normally insoluble in water or other aqueous solutions. It has been thought that this material represented the highest possible state of purity of the hormone and that it was impossible to put the active principle into an aqueous solution without destroying the activity thereof. This material, however, in addition to the active principle thereof, I have found contains even in its highest state of purity previously produced, oil, lipoids, cholesterol, coloring matter and other substances and that the hormone is many times more soluble in these contaminating substances than in water or aqueous solutions, and that when the hormone in the presence of oil and the other impurities is agitated with water, because of this different degree of solubility, the active hormone remains dissolved in the oil and is not dissolved in the water. Any attempt to separate all these substances from the hormone in one step is unsuccessful as the hormone remains dissolved in the mixture of lipoids. According to my process, therefore, the oil, cholesterol, coloring matter and other foreign materials are separately removed from the combination with the hormone in a series of steps leaving as a final product the hormone with a very slight admixture with the foreign matter and in such condition that the same may be dissolved in water or other aqueous solutions.

As a specific example of the steps followed in preparing the hormone for aqueous solutions, I may take the light yellow waxy or oily substance produced according to the Fraenkel et al. Patent No. 1,314,321 or according to the processes described in my previous application which consists briefly in the following or equivalent steps, namely extracting the fresh glands, preferably finely ground ovaries, corpus luteum, liquor folliculi or placenta, with three times their weight of alcohol, distilling off the solvent leaving the lipoid material containing the hormone together with some fats, cholesterol, phospholipins, etc., emulsified in an aqueous solution, extracting the aqueous solution with ethyl acetate, washing the ethyl acetate solution with sodium carbonate to reduce the fatty acids, distilling off the ethyl acetate leaving the light yellow waxy substance previously referred to. This substance is now dissolved in methyl or ethyl alcohol in proportion of 10 grams of the substance to 100 cc. of alcohol. A portion of the cholesterol remains undissolved and the mixture is then chilled by suitable refrigeration which causes a further separation of cholesterol and some other contaminating materials which may be removed by filtration. The alcohol is then distilled from the filtrate and the residue dissolved in ether, benzene or other suitable solvent and agitated with a 2 to 10% solution of sodium or potassium hydroxide, which saponifies the fats and oils present. The mixture separates into two layers. The upper or ethereal layer contains the active hormone and the lower or hydroxide layer contains the saponified fats, oils, etc. The upper ether layer is separated from the lower layer and the step of saponification is repeated. The combined lower layers containing the saponified fats are collected together and re-extracted with ether or other suitable solvent to remove as much as possible of the hormone and the combined ethereal layers washed with from four to five portions of water to remove all traces of soap and alkali from the same. The ether or other solvent is then distilled off, leaving the hormone freed from a substantial portion of the cholesterol and oil originally contained therewith. The residue, after the evaporation of the solvent, is again dissolved in methyl alcohol in the proportion of 150 cc. of the methyl alcohol to 10 grams of original material and 10 cc. of normal hydrochloric acid added to produce a slightly acid solution. This alcoholic solution is then washed with petroleum ether, which removes further portions of cholesterol and other impurities, such as the coloring material, leaving a clear faintly colored solution. The petroleum ether solution is re-extracted with a further portion of acidulated methyl alcohol and the combined alcohol solutions are exactly neutralized by adding an amount of normal sodium hydroxide equivalent to the amount of hydrochloric acid used. The alcohol is evaporated and the residue containing the active principle of the hormone is agitated with neutral or faintly acidulated water which dissolves the hormone to provide an active aqueous hormone solution. The hormone appears to be sparingly soluble in water, as after agitation with one liter of water, repeated agitation of the hormone with a second and a third liter of water produces solutions of substantially the same degree of physiologic activity as the first liter. The solution of the sex hormones is clear and colorless as water and has no visible solids therein. As distinguished from the ovarian hormone described in my previous application, it is free from cholesterol. It is also free from protein. It may be sterilized by boiling or by heating in an autoclave at 10 to 15 lbs. pressure without destroying the activity and may be injected without causing serious irritation or pain. It is less toxic and of substantially the same activity as the sex hormone previously produced and can be used with safety for injection, either intramuscularly or subcutaneously. Its physiologic activity is such that 1 cc. or less of the aqueous ovarian solution produced above will produce artificial oestrus in an ovariectomized rat. Continued administration produces growth of the uterus, stimulates the genital organs in other ways and prevents changes in secondary sex characteristics, which ordinarily accompany ovariectomy. It is desirable during all of the steps above outlined to protect the hormone from oxidation, which may be done by carrying out the various steps in the presence of carbon dioxide, nitrogen or other nonoxidizing gas.

While my present process and product have been described with particular reference to an ovarian and/or testicular hormone, the basic principle which comprises elimination of the substances in which the hormone may be more soluble than in water may be practiced with reference to other hormones to provide an aqueous solution of the same and various changes may be made in the specific steps outlined, the essential point being to remove from the hormone the oils and other materials in which the hormone is more soluble than in water, to produce at the end the hormone substantially free from these foreign materials and in condition to be dissolved in water.

What I claim as my invention is:

1. The method of preparing an aqueous solution from the hormone of the sex glands including as a class the ovaries, corpus luteum and placenta which comprises dissolving the light yellow waxy substance containing the active principles of the hormone in methyl alcohol, cooling to cause coagulation of the cholesterol, filtering, distilling off the alcohol, dissolving the residue in ether, saponifying the oils and fats in said ether solution with the addition of an alkali, evaporating the ether, dissolving the residue in acidified methyl alcohol, extracting the remaining portions of cholesterol and coloring matter in said alcohol solution by the use of petroleum ether, neutralizing the alcohol solution, distilling the alcohol and dissolving the residue in faintly acidulated water.

2. The method of preparing a clear aqueous solution of an active hormone of the sex glands, including as a class the ovaries, corpus luteum and placenta, which hormone is normally more soluble in lipoids and lipoid solvents than in water, which comprises extracting the fresh glands with an alcoholic solvent, driving off the solvent, leaving the hormone suspended in an aqueous emulsion, agitating the emulsion with an alkyl acetate to dissolve out the hormone together with some cholesterol and lipoid material, driving off the solvent, dissolving in alcohol, chilling to precipitate cholesterol filtering, distilling off the alcohol, dissolving in ether, saponifying the lipoid oils and fats in said ether solution with the addition of an alkali, distilling the ether solution, dissolving in alcohol, extracting the remaining portions of cholesterol and coloring matter in said alcohol solution by the use of petroleum ether, neutralizing the alcohol solution, distilling the alcohol and dissolving the residue in faintly acidulated water.

3. The method of preparing a clear aqueous solution of an active hormone of the sex glands including as a class the ovaries, corpus luteum and placenta, which hormone is normally more soluble in lipoids and lipoid solvents than in water, which comprises extracting the fresh glands with an alcoholic solvent, driving off the solvent, leaving the hormone suspended in an aqueous emulsion, agitating the emulsion with an alkyl acetate to dissolve out the hormone together with some cholesterol and lipoid material, driving off the solvent, dissolving in alcohol, removing cholesterol from the hormone while suspended in the alcohol solution by chilling the same, removing the fats and oils from the hormone while suspended in the ether solution by saponification of said fats and oils, and removing the remaining cholesterol, coloring matter and other impurities by washing the hormone while suspended in alcohol with petroleum ether and dissolving the purified hormone in an aqueous solution.

4. The method of concentrating and purifying the hormones of the female sex glands including as a class, the ovaries, corpus luteum and placenta, which comprises extracting the hormone from the fresh glands with a water and lipoid solvent, driving off the solvent to produce an aqueous lipoid residue and extracting the hormones from the residue at least once with an immiscible fat solvent, removing the fat solvent, redissolving the hormone in a further fat solvent, and removing the fats and oils from the solution by saponification, removing the fat solvent, dissolving in alcohol and removing further fats from the hormone while dissolved in the alcoholic solution, by washing with a further fat solvent immiscible in alcohol, removing the alcohol and dissolving in water to produce a water soluble hormone extract.

5. A potent water soluble and oil free extract from tissues containing the female sex hormones such as the ovaries, corpus luteum and placenta, said extract being of the order obtained by treating fresh ovarian tissue with a water and lipoid solvent to remove the lipoids therefrom, concentrating the solution to an aqueous lipoid material, treating said aqueous lipoid material with an immiscible fat solvent, removing the fat solvent, redissolving in a further fat solvent and removing the oils and fats therefrom by saponification while leaving the hormones dissolved in said fat solvent, removing the fat solvent and dissolving in alcohol, washing said alcohol solution with a further, alcohol immiscible, fat solvent removing the alcohol and dissolving the hormones in an aqueous solution.

6. A potent water soluble and oil free extract from tissues containing the female sex hormones, such as the ovaries, corpora lutea and placentae of such activity that 1 cc. or less will produce artificial oestrus in an ovariectomized rat, said extract being of the order obtained by treating fresh ovarian tissue with a solvent which is miscible with water and will dissolve much of the lipoid materials from the fresh gland tissue, concentrating the solution to a residue consisting of an aqueous suspension of the dissolved materials, treating said residue with an immiscible fat solvent, removing the fat solvent, redissolving in a further fat solvent and removing the fats therefrom by saponification, while leaving the hormones dissolved in said fat solvent, removing the fat solvent and dissolving in alcohol, washing said alcohol solution with a further, alcohol immiscible solvent, removing the alcohol and dissolving the hormones in an aqueous solution.

FRANK R. ELDRED.